United States Patent
Audouin

(10) Patent No.: US 9,442,041 B2
(45) Date of Patent: Sep. 13, 2016

(54) METHOD FOR DETERMINING THE QUANTITY OF REDUCING AGENT IN A TANK

(75) Inventor: Arnaud Audouin, Paris (FR)

(73) Assignee: AAQIUS & AAQIUS S.A., Geneva (CH)

( * ) Notice: Subject to any disclaimer, the term of this patent is extended or adjusted under 35 U.S.C. 154(b) by 277 days.

(21) Appl. No.: 14/128,501

(22) PCT Filed: Jun. 22, 2012

(86) PCT No.: PCT/EP2012/062070
§ 371 (c)(1),
(2), (4) Date: Dec. 20, 2013

(87) PCT Pub. No.: WO2012/175661
PCT Pub. Date: Dec. 27, 2012

(65) Prior Publication Data
US 2014/0109657 A1    Apr. 24, 2014

(30) Foreign Application Priority Data

Jun. 24, 2011    (EP) .................................... 11005150

(51) Int. Cl.
*G01M 15/04*    (2006.01)
*F01N 3/20*    (2006.01)
*F01N 11/00*    (2006.01)

(52) U.S. Cl.
CPC .......... *G01M 15/042* (2013.01); *F01N 3/2066* (2013.01); *F01N 11/00* (2013.01); *F01N 2610/02* (2013.01); *F01N 2610/10* (2013.01); *F01N 2610/12* (2013.01); *F01N 2900/1808* (2013.01); *F01N 2900/1814* (2013.01); *Y02T 10/24* (2013.01); *Y02T 10/47* (2013.01)

(58) Field of Classification Search
None
See application file for complete search history.

(56) References Cited

U.S. PATENT DOCUMENTS

| | | | |
|---|---|---|---|
| 6,209,315 B1* | 4/2001 | Weigl | B01D 53/9431 60/274 |
| 6,399,034 B1* | 6/2002 | Weisweiler | B01D 53/9431 423/213.2 |
| 6,613,292 B1* | 9/2003 | Huthwohl | B01D 53/9431 422/171 |
| 2010/0071349 A1* | 3/2010 | Kitazawa | F01N 3/2066 60/277 |

FOREIGN PATENT DOCUMENTS

| | | |
|---|---|---|
| DE | 10 2006 061 370 A1 | 6/2008 |
| DE | 10 2008 001 004 A1 | 10/2009 |
| DE | 10 2009 058 300 A1 | 6/2010 |
| DE | 10 2009 047 159 A1 | 6/2011 |
| DE | 10 2009 047 475 A1 | 6/2011 |

* cited by examiner

*Primary Examiner* — Hezron E Williams
*Assistant Examiner* — Mark A Shabman
(74) *Attorney, Agent, or Firm* — Blakely Sokoloff Taylor & Zafman LLP

(57) ABSTRACT

A method for determining the quantity of reducing agent in a tank of a motor vehicle, including: a storage material in the tank for storing and releasing the reducing agent according to demand; a heating device to supply heat to release the reducing agent, and a control device for driving the heating device. After the motor vehicle is started, driving the heating device so that it delivers constant power during an initial phase over which the pressure inside the tank increases until it reaches a predetermined value. The heating device then regulating the pressure around a datum value; then measuring the time of the initial phase or the derivative of pressure with respect to time during this initial phase; and comparing the measured time against various calibrated values of the initial phase in order to determine the quantity of reducing agent in the tank.

6 Claims, 2 Drawing Sheets

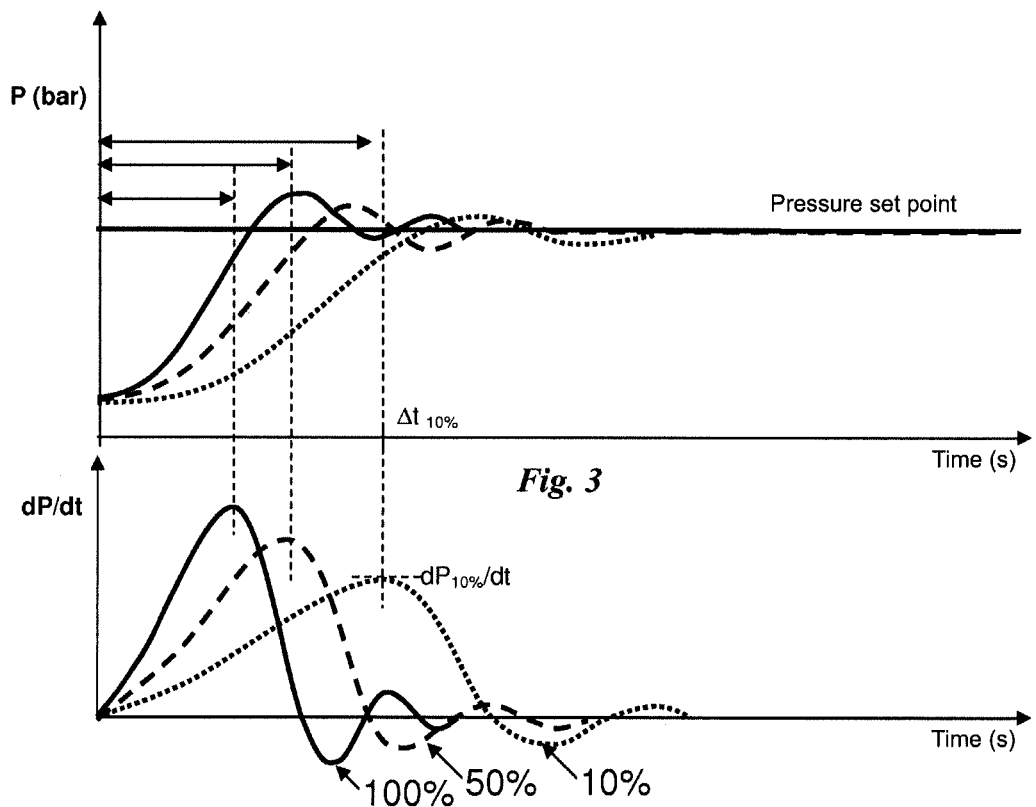
Fig. 3
Fig. 4
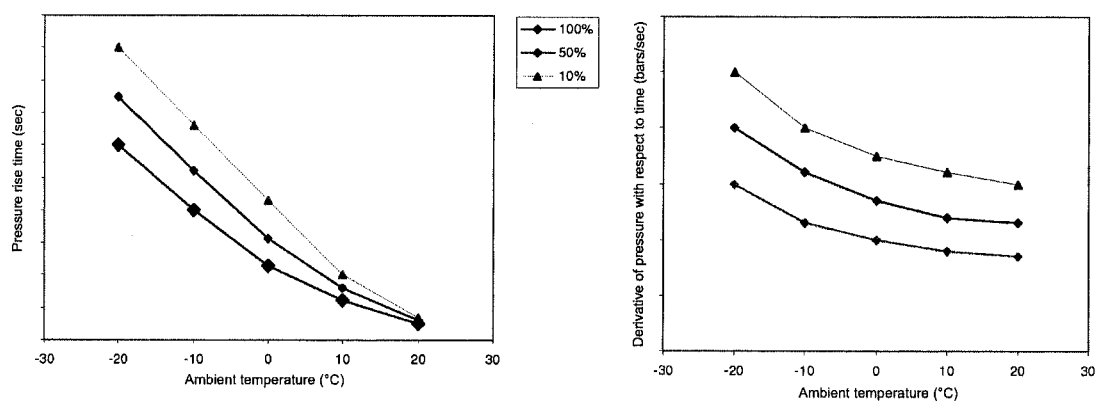
Fig. 5
Fig. 6

METHOD FOR DETERMINING THE QUANTITY OF REDUCING AGENT IN A TANK

The proposed invention relates to a device for measuring the level of a reducing agent contained in a tank.

Emissions of pollutants linked to transport have been a major driver of progress in industry for nearly thirty years. The progressive tightening of the emission limits for the four regulated pollutants (CO, HC, NOx, particles) has made it possible to significantly improve air quality, particularly in large built up areas.

The ever increasing use of automobiles requires the continuation of efforts to reduce these emissions of pollutants even further. Thus, the reduction of nitrogen oxides (NOx) remains a complex problem in the context of the more stringent European emission levels expected in 2015 for the entry into force of the € 6 standard. Having available high efficiency clean up technologies in all running conditions remains a major challenge for the transport industry.

Secondly, the consumption of fuel, directly linked with CO2 emissions, has become a major concern. Thus, a regulation will be put in place at the European level from 2012 on emissions of CO2 from private vehicles. It is already agreed that this limit will be regularly lowered over the decades to come. The reduction of CO2 has thus obviously been imposed for the entire transport industry.

This double problem of reduction of local pollution (NOx) and reduction of fuel consumption (CO2) is particularly difficult for the Diesel engine, the lean burn of which is accompanied by NOx that are difficult to treat.

Devices already exist, such as that described in EPI977817, enabling the reduction of the quantity of NOx by means of a SCR (Selective Catalytic Reduction) catalyst using ammonia stored in a storage material of the alkaline-earth chloride salt type arranged inside a tank. The injection of ammonia into the exhaust gases is driven by means of a heating device making it possible to heat the storage material in order to enable the reversible absorption/desorption ammonia reaction since this reaction is directly linked to the temperature within the storage material.

In practice, ammonia is injected into the exhaust continuously in the stoichiometric proportions of the NOx reduction reaction. It is thus necessary to be able to store on board a sufficient quantity of ammonia. To limit the size of the tank containing the storage material, automobile manufacturers favour a filling or a replacement of the tank periodically, for example during engine maintenance (oil change) or when filling the fuel tank. Depending on the vehicles considered (private vehicles, heavy goods vehicles, etc.) it is necessary to provide between 10 and 100 operations of filling the tank or replacement thereof during the lifetime of the vehicle.

This periodic maintenance operation, required to assure an efficient clean-up of NOx throughout the lifetime of the vehicle, is the subject of specific regulations in the different countries where SCR technology is used. A point common to all of these regulations is the necessity of being able to determine the quantity of ammonia remaining in the tank to be able to warn the driver when filling has to be carried out. For example, in the European legislation for private vehicles, it is necessary to be able to measure at least two remaining operating range thresholds, at 2400 km and 800 km (corresponding approximately to respectively 3 fill-ups and 1 fill-up of fuel).

Moreover, in the case where several tanks each comprising an ammonia storage material are on board the vehicle in order to simplify the integration of the ammonia storage system in the vehicle, or to improve its operation (introduction of a cooling unit), it is necessary to know the quantity of ammonia remaining in each tank so that the engine control unit can drive in an optimal manner the injection of the ammonia contained in these different tanks.

Thus, the aim of the present invention is to propose a means of determining the quantity of reducing agent, preferably ammonia, contained in a tank.

According to the invention, this aim is attained thanks to a method of determining the quantity of a reducing agent in a tank of a system intended to reduce the quantity of NOx in the exhaust gases of a motor vehicle. The system includes:
- a storage material arranged in the tank and capable of storing and of releasing the reducing agent reversibly according to the demand for reducing agent which may vary over the course of time;
- a heating device designed to supply heat for releasing the reducing agent from the storage material;
- a control device for driving the heating device in order to release the reducing agent, the method according to the invention includes the following steps:
a) determining whether, when the motor vehicle is started, the pressure and the temperature inside the tank are stabilised,
b) in the affirmative, driving the heating device so that it delivers constant power during a phase known as the initial phase so that the pressure inside the tank increases until it reaches a predetermined value before switching over to a phase know as regulation of the pressure around a datum value;
c) measuring the time of the initial phase;
d) comparing the measured time of said initial phase against various calibrated values specific to the tank in order to determine the quantity of reducing agent in said tank.

The characteristics of the invention will become clearer on reading the description of a preferential form of embodiment, given uniquely by way of example and in no way limiting, and by referring to the schematic figures in which:

FIG. 3 illustrates the evolution of the pressure inside the tank as a function of three rates of filling the tank with reducing agent;

FIG. 4 illustrates the derivative of pressure with respect to time inside the tank according to FIG. 3 as a function of three rates of filling the tank with reducing agent;

FIG. 5 represents a mapping of the pressure rise time as a function of the ambient temperature for three rates of filling the tank with reducing agent, and FIG. 6 represents a mapping of said derivative of pressure with respect to time as a function of the ambient temperature for the three rates of filling the tank with reducing agent.

Figure 1:
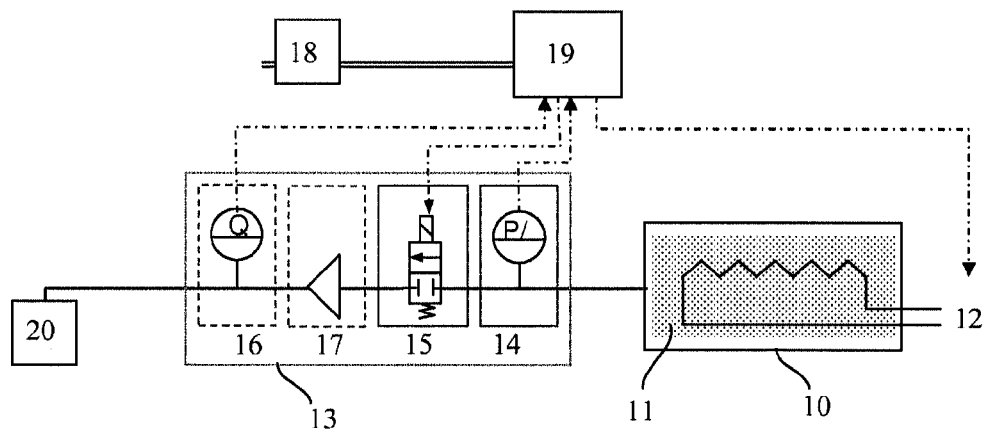
FIG. 1 represents a functional architecture of the ammonia storage and supply system.

The system for the implementation of the method according to the invention includes according to FIG. 1 a tank 10 containing a storage material 11 wherein is stored preferably ammonia for the reduction of NOx in the exhaust gases of a motor vehicle. A heating device 12 is designed to supply heat to the storage material 11 so that ammonia can be desorbed therefrom then injected into the exhaust gases. The heating device 12 is in the form of electrical resistance but may also be in the form of a heat exchanger supplied by a heat transfer fluid such as the engine coolant or the exhaust gases of the motor vehicle.

Figure 2:
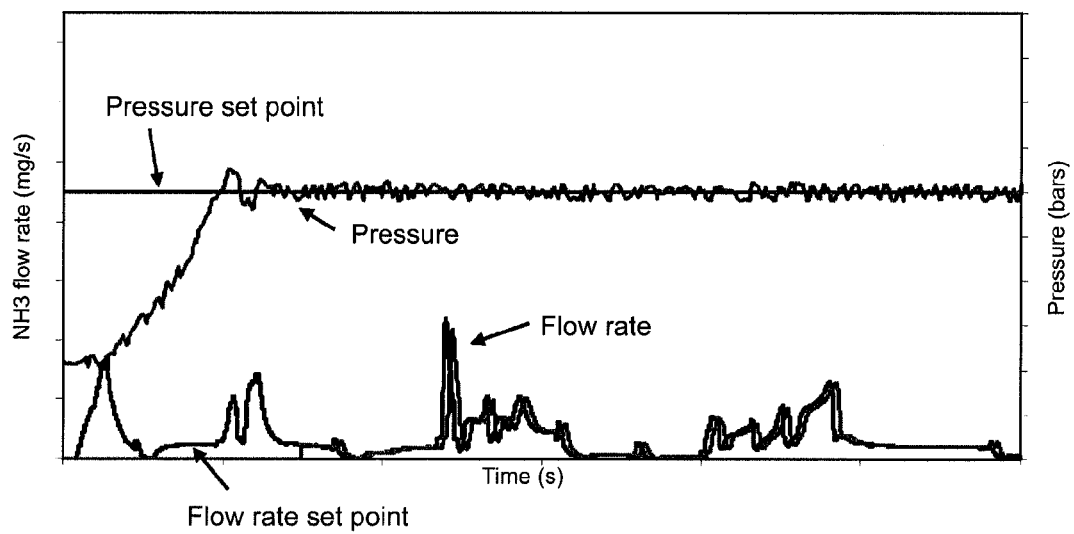
FIG. 2 illustrates the evolution of the pressure in the tank as well as the flow rate of ammonia during the initial and regulation phases of the system.

The system further includes a control device 13 which enables, according to FIG. 2, on the one hand the regulation of the pressure inside the tank 10 around a datum value and on the other hand the metering of ammonia so that it can be injected continuously into the exhaust gases of the motor vehicle in the stoichiometric proportions of the NOx reduction reaction.

The pressure set point is determined dynamically as a function of an analysis of a certain number of engine and vehicle parameters, such as for example the concentration of NOx emitted at each instant, the temperature of the engine lubricant, the temperature of the engine coolant, the speed of the vehicle, the engine speed, the engine load or a combination of these parameters.

The control device 13 preferably includes a pressure sensor 14 designed to measure the pressure inside the tank 10 and a metering unit 15 of the ammonia gases such as an electromagnetic valve. It should be pointed out that a temperature sensor may replace the pressure sensor, the pressure being determined by calculation. A flow meter 16 for measuring the flow rate of ammonia is, preferably, added at the outlet of the metering unit 15. This also includes at its outlet a sonic throat 17, making it possible to attenuate pressure oscillations. At least some of the parameters of the preceding paragraph are integrated in an electronic control unit 18 connected to the engine control unit 19, so that the control unit 18 can drive the heating device 12 so as to obtain a datum pressure that is representative of the running conditions of the motor vehicle.

When a sufficiently high and sufficiently stable pressure is generated inside the tank 10, the metering unit 15 looped on the flow meter 16 makes it possible to inject ammonia into the exhaust gas of the motor vehicle by means of an injection module 20 according to the flow rate calculated by the control unit 19.

According to the preferential form of the invention, the heating device 12 is driven so that it delivers its maximum power to accelerate the pressure rise inside the tank 10, and does so after the motor vehicle has been started when the conditions are favourable and uniquely during a phase known as the initial phase preceding a phase known as regulation of the pressure inside the tank 10 around a set point pressure, the value of which is calculated by several parameters already evoked above.

When the pressure inside the tank 10 approaches the datum value, the control unit 19 drives the power of the heating device 12 in order to regulate the pressure inside the tank 10 around the calculated datum pressure.

The time necessary, as soon as the vehicle is started, for the pressure inside the tank 10 to approach the datum value depends on several parameters, particularly:
  the initial pressure in the tank 10 when the motor vehicle is started, linked with the ambient temperature and the time spent from the stoppage of the vehicle;
  the power of the heating device 12;
  the thermal conductivity of the storage material 11.

Since the thermal conductivity of metal chloride salts is low, an expanded natural graphite type binder is added to the salt.

The rate of filling the material with ammonia also has an impact on the pressure rise inside the tank 10. In fact, when the storage material 11 is totally saturated with ammonia, the heat transmitted by the heating device 12 is immediately available to raise the temperature of the ammoniate complexes that are situated close by, which has the consequence of an increase in the pressure inside the tank 10. When the storage material 11 empties of ammonia, the heat must be transmitted within the material up to the ammoniate complexes the furthest from the heating device 12. A slower evolution of the pressure ensues as the material 11 empties of ammonia. In addition, due to the volumic contraction of said material 11 during its ammonia desorption, its thermal conductivity drops progressively as the tank empties of ammonia.

Given what precedes, the rate of filling the tank 10 with ammonia is evaluated by three operations carried out successively at each engine start up, namely:
  an operation consisting in selecting the favourable conditions for the evaluation of the quantity of ammonia in the tank;
  an operation consisting on the one hand in measuring the pressure rise time inside the tank 10 and on the other hand in determining the derivative of pressure with respect to time that results therefrom;
  an operation consisting in determining the quantity of ammonia in the tank as a function of the pressure rise time and the derivative of pressure with respect to time.

Selection of Favourable Conditions

The objective of this operation is to select representative cases for the measurement of the pressure rise in the tank 10 during the initial phase. A positive set point is transmitted when two conditions are satisfactory.

The first condition is to assure that the initial conditions are stabilised so that the tank 10 has returned to a stabilised temperature and pressure state after the preceding running (no temperature gradient in the material). To do so, the pressure measurement when the system is started (P0: initial pressure) will be compared to the expected equilibrium pressure ($P_{amb}$) in the storage vessel at ambient temperature. This expected pressure is calculated using the measurement of the ambient temperature ($T_{amb}$) available in the engine control unit 19 by the Clausius-Clapeyron relation below in which $\Delta Hr$ and $\Delta Sr$ are characteristic of the material employed and R the perfect gas constant.

$$\ln P_{amb} = \frac{-\Delta Hr}{R \times T_{amb}} + \frac{\Delta Sr}{R}$$

When the initial pressure P0 measured at start up is too different from the expected pressure $P_{amb}$, the conditions are not favourable for a relevant evaluation, the set point is negative. In practice, the pressure and the temperature inside the tank 10 are considered as stabilised if: $0.7 \times P_{amb} < P0 < 1.3 \times P_{amb}$. A more restrictive value may be envisaged of the order of $0.8 \times P_{amb} < P0 < 1.2 \times P_{amb}$.

The second condition is that the pressure rise phase (initial phase) must take place normally. The aim is to eliminate cases where the pressure rise phase has not been able to take place in the representative conditions, in other words for a constant maximal power throughout the entire duration of the pressure rise. This is for example the case during an engine stoppage during the pressure rise or when there is insufficient availability in electrical energy (battery charge).

Evaluation of the Operating Range

The evolution of the pressure inside the tank 10 during the initial phase preceding the phase of regulating said pressure around a datum value is shown schematically in the graph of FIG. 3 for three different rates of filling the storage material with ammonia and consequently the tank that incorporates said material. More particularly, the evolution of the pressure inside the tank during said initial phase is shown schematically for a rate of filling the tank with ammonia that is respectively 100%, 50% and 10%. One notes, according to FIG. 3, as the storage material empties of ammonia, the pressure rise during the initial phase is slower.

According to the graph of FIG. 4, wherein is represented the evolution of the derivative of pressure with respect to time as a function of three rates of filling the tank, this derivate with respect to time increases progressively up to the switch over into the regulation phase. As the material empties of ammonia, the thermal conductivity drops, the derivate with respect to time value drops.

The evaluation of the operating range is determined by two mappings. One of the mappings represents the pressure rise time inside the tank during the initial phase according to the ambient temperature and as a function of the rate of filling the tank 10 with ammonia (FIG. 5). The other of the mappings represents not the pressure rise time but the derivative of pressure with respect to time (FIG. 6).

In the present invention, when favourable conditions are selected, the values Δ t and dp/dt measured during the initial phase make it possible to evaluate the remaining operating range by these 2 characteristic mappings of the considered system and for the initial pressure measured when the engine is started. Thus, it is possible to define by calibration for the tank considered the quantity of ammonia in the tank.

Construction of the Operating Range Information

An interest of the method according to the invention is the large number of measurements available (virtually one after each start up). A limit of this evaluation by mapping is the low precision of the estimation of the quantity of ammonia, in particular in the case where the initial pressure is close to the datum pressure (for example, for an ambient temperature between 20 and 30° C.)

For this reason, the estimation of the level of ammonia in the tank 10 is determined from the regular measure of the two parameters "pressure rise time" and "derivate of pressure with respect to time". In a favoured configuration of the invention, aberrant values, i.e. too distant from the preceding measurements (for example of the 5 to 10 preceding measurements) will be eliminated. An information on the quantity of ammonia in the tank will be recalculated as the sliding average of the X last measurements (included between 5 and 50) for each of the 2 "pressure rise time" and "derivate of pressure with respect to time" measurements by weighting each of the measurements of the average by a weighting that is all the greater the lower the ambient temperature (more precise measurement at low ambient temperature).

Finally, the information on the quantity of ammonia in the tank transmitted to the remainder of the system will be calculated as the average value of these 2 information items from the "pressure rise time" and "derivate of pressure with respect to time" measurements.

It goes without saying that the invention is not limited to the embodiments described above by way of example but that it encompasses, on the contrary, all embodiment variants. For example, the measurement device may also be used for the estimation of the quantity of hydride of a fuel cell of a hydrogen storage system.

The invention claimed is:

1. Method for determining the quantity of a reducing agent in a tank of a system to reduce the quantity of NOx in the exhaust gases of a motor vehicle, said system including:
   a storage material arranged in the tank and for storing and releasing the reducing agent reversibly according to a demand for the reducing agent which may vary over the course of time;
   a heating device designed to supply heat in order to release the reducing agent from the storage material, and
   a control device for driving the heating device in order to release the reducing agent,
   wherein the method includes the following steps:
   a) immediately after the motor vehicle is started, driving the heating device so that it delivers constant power during an initial phase over which the pressure inside the tank increases until it reaches a predetermined value, the driving of the heating device then being adapted in order to regulate the pressure around a datum value;
   b) measuring the time of the initial phase and the derivative of the pressure with respect to time during the initial phase;
   c) comparing the measured time of the initial phase, said derivative of the pressure with respect to time or a combination of both against a plurality of calibrated values of the initial phase according to the quantity of reducing agent in the tank in order to determine said quantity of reducing agent in said tank.

2. Method according to claim 1, wherein an average is taken between the measured time of the initial phase and the measured time of the derivative of the pressure with respect to time.

3. Method according to claim 1, wherein it includes an additional step preceding step a), of determining whether, after the motor vehicle is started, the pressure and the temperature inside the tank are stabilised.

4. Method according to claim 3, wherein during said additional step the initial pressure inside the tank is measured then is compared to an equilibrium pressure, and wherein the pressure and the temperature inside the tank are considered as stabilised if:

$$0.7 \times P_{amb} < P_0 < 1.3 \times P_{amb}.$$

Po is the pressure inside the tank,
$P_{amb}$ is the pressure equilibrium.

5. Method according to claim 4, wherein the equilibrium pressure is calculated by the relation:

$$\ln P_{amb} = \frac{-\Delta Hr}{R \times T_{amb}} + \frac{\Delta Sr}{R}$$

where: ΔHr is the enthalpy and ΔSr the entropy of formation of the reducing agent/storage material complex for the considered stoichiometry,
R is the perfect gas constant, and
$T_{amb}$ is the ambient temperature
ln $P_{amb}$ is the natural logarithm of $P_{amb}$.

6. Method for determining the quantity of a reducing agent in a tank of a system to reduce the quantity of NOx in the exhaust gases of a motor vehicle, said system including:
   a storage material arranged in the tank and for storing and releasing the reducing agent reversibly according to a demand for the reducing agent which may vary over the course of time;
   a heating device designed to supply heat in order to release the reducing agent from the storage material, and
   a control device for driving the heating device in order to release the reducing agent,
   wherein the method includes the following steps:
   a) immediately after the motor vehicle is started, driving the heating device so that it delivers constant power during an initial phase over which the pressure inside the tank increases until it reaches a predetermined value, the driving of the heating device then being adapted in order to regulate the pressure around a datum value;
b) measuring the time of the initial phase and the derivative of the pressure with respect to time during the initial phase;
c) comparing said derivative of the pressure with respect to time against a plurality of calibrated values of the initial phase according to the quantity of reducing agent in the tank in order to determine said quantity of reducing agent in said tank.

* * * * *